(12) United States Patent
Asano (10) Patent No.: US 7,429,344 B2
(45) Date of Patent: Sep. 30, 2008

(54) METHOD OF MOUNTING A RESIN-MOLDED MEMBER

(75) Inventor: Katsuki Asano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 601 days.

(21) Appl. No.: 10/206,670

(22) Filed: Jul. 29, 2002

(65) Prior Publication Data

US 2003/0025242 A1 Feb. 6, 2003

(30) Foreign Application Priority Data

Jul. 31, 2001 (JP) ............... 2001-231306

(51) Int. Cl.
*B29C 61/02* (2006.01)
*B29C 65/66* (2006.01)
(52) U.S. Cl. .............. 264/230; 264/238; 264/250
(58) Field of Classification Search ........... 264/250, 264/230
See application file for complete search history.

(56) References Cited

U.S. PATENT DOCUMENTS

| | | | | | |
|---|---|---|---|---|---|
| 3,640,417 | A | * | 2/1972 | Sakurai ............... | 215/246 |
| 3,955,699 | A | * | 5/1976 | Amberg et al. ........ | 215/246 |
| 4,564,156 | A | * | 1/1986 | Cybulski ............. | 242/612 |
| 4,606,511 | A | * | 8/1986 | Machida ............. | 242/610.6 |
| 5,289,326 | A | * | 2/1994 | Matsuwaka et al. .... | 360/271.1 |
| 5,716,575 | A | * | 2/1998 | Kammler et al. ...... | 264/242 |
| 5,761,788 | A | * | 6/1998 | Hirota et al. ........ | 29/527.1 |
| 5,993,718 | A | * | 11/1999 | Gumbert ............. | 264/242 |

FOREIGN PATENT DOCUMENTS

| | | |
|---|---|---|
| DE | 196 35 049 A1 | 3/1998 |
| DE | 696 05 070 T2 | 7/2000 |
| EP | 0 919 361 A2 | 6/1999 |
| EP | 1 166 999 A1 | 1/2002 |
| JP | 56156956 A * | 12/1981 |
| JP | 61142585 A * | 6/1986 |
| JP | 7-18068 | 7/1988 |
| JP | 2000-167865 * | 6/2000 |

OTHER PUBLICATIONS

"Molding Processing of Plastics (First)," Edited by Patent Office, Examination Guideline Classified by Industry, [2] (third) Molding Processing of Plastics, Japan, Japan Institute of Invention and Innovation, Industry [2]-25-77, 92, 93, Issued Mar. 4, 1969.

* cited by examiner

*Primary Examiner*—Edmund H. Lee
(74) *Attorney, Agent, or Firm*—Sughrue Mion, PLLC (57) ABSTRACT

A method of mounting a mounting member onto a member to be mounted, at least one of which is resin-molded is carried out by molding the mounting member and the member to be mounted and mounting the mounting member to the member to be mounted, utilizing post-molding shrinkage. Accordingly, neither formation of fitting portions of the pivot member and the hub member nor pressing of the pivot member into the hub body is needed, whereby reels can be manufactured with high productivity.

11 Claims, 7 Drawing Sheets

METHOD OF MOUNTING A RESIN-MOLDED MEMBER

BACKGROUND OF THE INVENTION

1. Field of the Invention

The present invention relates to a method of mounting a resin-molded member.

2. Description of the Related Art

Generally, in audio and video apparatus, a magnetic tape is often used to record and play back information. The magnetic tape is wound around a pair of reels and conveyably retained within a cassette case.

Figure 6:
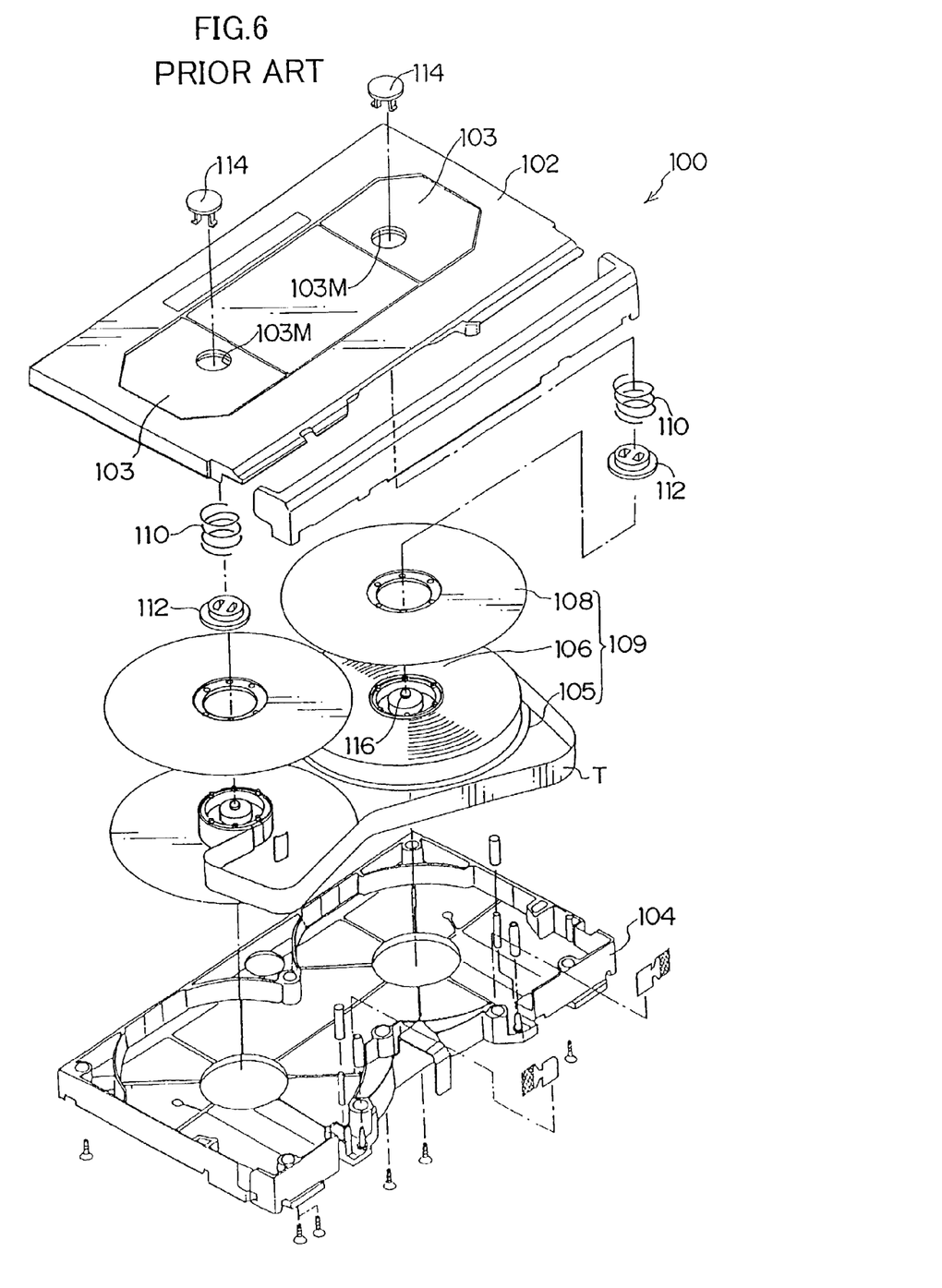
FIG. 6 is a developed perspective view of a structure of a conventional magnetic tape cassette.

For example, as shown in FIG. 6, a magnetic tape cassette 100 employed for business use at a broadcasting station includes an upper half 102 and a lower half 104 that form a case. A pair of reels 109 is rotatably supported inside the case. Each reel comprises a lower flange 105, a hub 106 that is integrally fixed to an upper portion of the lower flange 105, and an upper flange 108 that is mounted to an upper portion of the hub 106. A magnetic tape T is wound around the pair of the reels 109. A window 103 made of a clear plate is disposed at the upper half 102.

A pair of reel holders 112 for pressing the reels 109 and a pair of compression coil springs 110 for pressing the reel holders 109 are interposed between the upper half 102 and the reels 109, and the reels 109 are urged toward the lower half 104 by the reel holders 112. The reel holders 112 respectively engage with a pair of the center caps 114, and the center caps 114 are engaged with opening edges 103M formed on the window 103.

Figure 7:
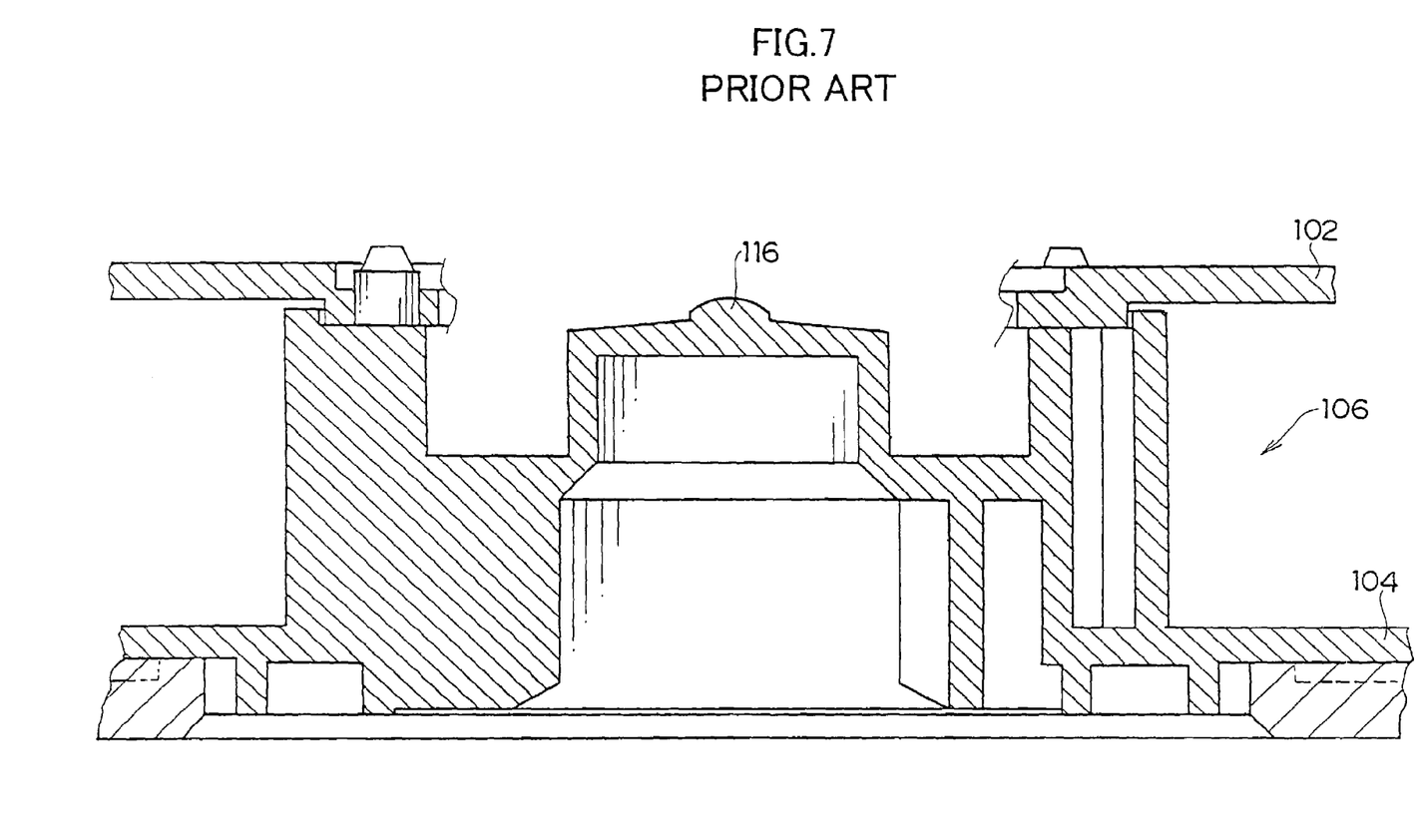
FIG. 7 is a side cross-sectional view of a reel of the conventional magnetic tape cassette.

As shown in FIG. 7, a pivot 116 is disposed at the central portion of the upper surface of the hub 106, and the upper portion of the pivot 116 has a spherical surface. The pivot 116 is pressed by the reel holders 112 to swingably retain the reels 109. Further, the pivot 116 is molded integrally with the hub 106, and is often made of a general-use material such as acrylnitrilbutadiene (ABS) resin or polystyrene (PS).

The reel holder 112 is a hat-shaped member and has an inner bottom surface 112B abutting the pivot 116, and is often made of a general-use polyacetal (POM) resin.

From a viewpoint of traveling stability or durability of a tape, it is preferable that the pivot 116 and the hub 106 are molded into different members, and having the member including the pivot 116 mounted to the hub 106.

However, if the pivot 116 and the hub 106 are molded into different members, fitting portions or engagement portions of the member including the pivot 116 and the hub 106 need to be formed and assembled with high precision. Further, each of the components must be stored until shrinkage due to molding of each component stops. Therefore, a problem has been caused in that productivity deteriorates.

This problem is not limited to reels used for the magnetic tape cassette 100, but often occurs with a mounting member (the hub body 106 or the member including the pivot 116) and a member to be mounted (the hub body 106 or the member including the pivot 116), at least one of which is a resin-molded.

SUMMARY OF THE INVENTION

In view of the aforementioned facts, an object of the present invention is to provide a method of mounting a mounting member to a member to be mounted, at least one of which is resin-molded, with high productivity.

A first aspect of the present invention is a method of mounting a mounting member onto a member to be mounted, at least one of which is resin-molded, comprising the steps of: molding the mounting member and the member to be mounted; and mounting the mounting member to the member to be mounted, utilizing post-molding shrinkage.

For example, if the mounting member is a resin-molded member, when the mounting member is molded, the dimension is larger so as to correspond to post-molding shrinkage of the mounting member which has just been molded. The mounting member which has just been molded is aligned with the member to be mounted, and mounted thereto.

For example, if both of the mounting member and the member to be mounted are resin-molded members, the mounting member and the member to be mounted are molded at different times. Both members can be mounted to each other by utilizing post-molding shrinkage.

Accordingly, neither pressing of the mounting member into the member to be mounted nor forming of fitting portions of the members with high precision is needed. Accordingly, since post-molding shrinkage is utilized, components can be assembled without being stored immediately after molding. Consequently, the molded mounting member and the member to be mounted are mounted to each other with high productivity, and components or the like can be assembled. This mounting method is especially advantageous when large members are mounted.

A mounting formation of the mounting member and the member to be mounted is not limited to, but can be in a fitted state or a state with a predetermined clearance.

A second aspect of the present invention is a method of mounting a mounting member onto a member to be mounted, the mounting member and the member to be mounted being components of a magnetic tape cassette that are assembled together in the magnetic tape cassette, and at least one of which is resin-molded, the method comprising the steps of: molding the mounting member and the member to be mounted; and assembling the mounting member and the member to be mounted together, utilizing post-molding shrinkage.

DESCRIPTION OF THE PREFERRED EMBODIMENTS

Description of reels that are housed in a magnetic tape cassette according to embodiments of the present invention will now be given.

First Embodiment

Figure 1:
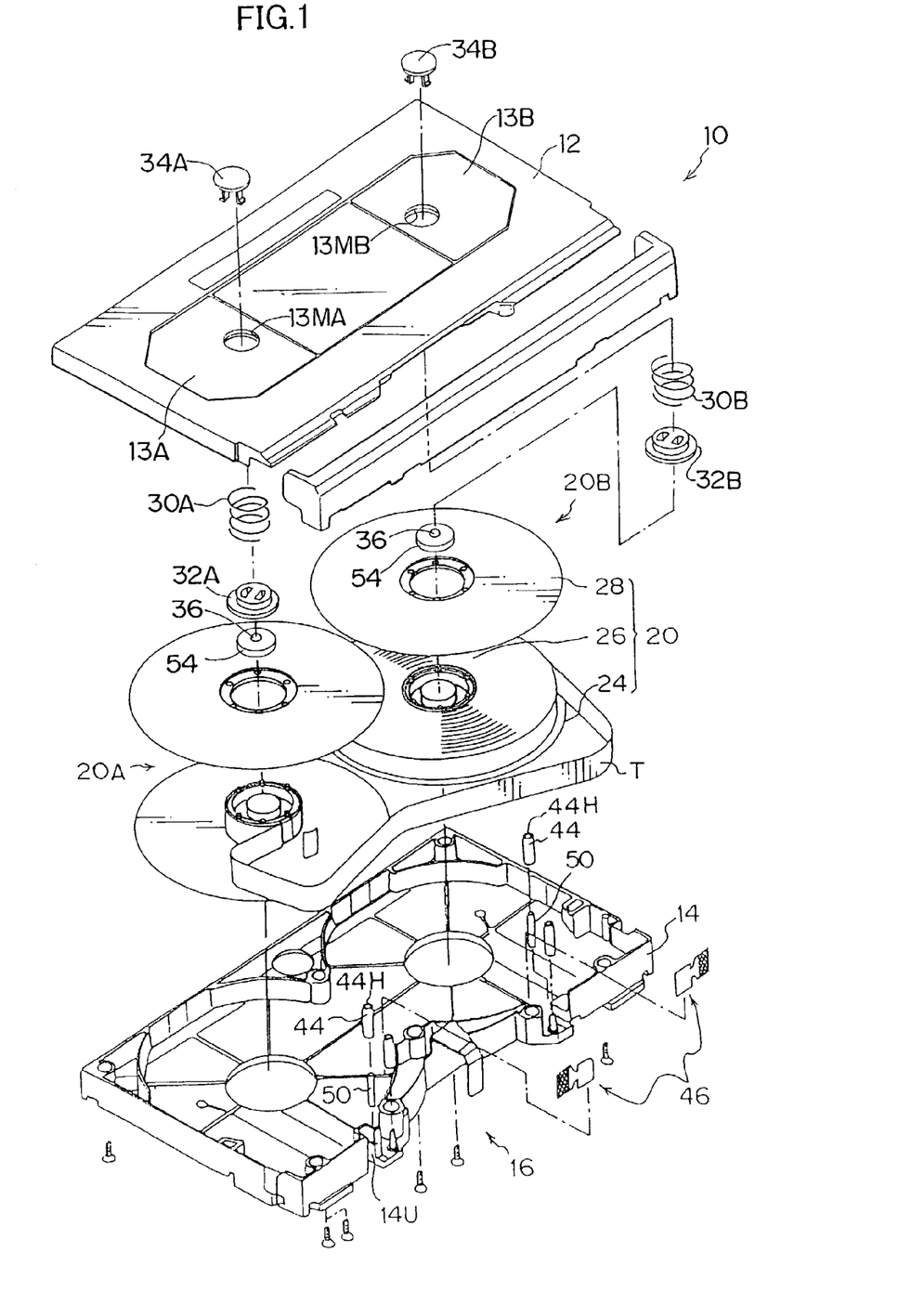
FIG. 1 is a developed perspective view of a magnetic tape cassette according to a first embodiment of the present invention.

First, description of a first embodiment of the present invention will be given. As shown in FIG. 1, a magnetic tape cassette (betacam L cassette) 10 that is used for business use by a broadcasting station includes an upper half 12 and a lower half 14 that form a case.

A pair of reels 20 is rotatably supported inside the case. Each of the pair of the reels 20 has a lower flange 24, a hub 26 that is integrally fixed to an upper portion of the lower flange 24, and an upper flange 28 that is mounted to an upper portion of the hub 26. A magnetic tape T is wound around the reels 20. Clear plate windows 13A and 13B are disposed at the upper half 12.

A hat-shaped reel holder 32A, which abuts an internal bottom surface of the reel 20A, and a compression coil spring 30A, which presses the reel holder 32A, are interposed between the upper half 12 and the reel 20A (see FIG. 1). The reel holder 32A urges the reel 20A toward the lower half 14 and engages with a center cap 34A that engages with an opening edge of an opening 13MA formed in the window 13A.

A reel holder 32B and a compression coil spring 30B are similarly interposed between the upper half 12 and the reel 20B. The reel holder 32B urges the reel 20B toward the lower half 14. The reel holder 32B engages with a center cap 34B, and the center cap 34B engages with an edge of an opening 13MB formed in the window 13B.

A pair of guide rollers 44 is disposed in the vicinity of an opening 16 at the front side of the magnetic tape cassette 10 to guide the magnetic tape T when it is played or rewound. Each of the guide rollers 44 is formed into a so-called barrel shape and includes an outer periphery that swells at an intermediate portion thereof.

The magnetic tape cassette 10 includes tape pads 46 that slidably contact and press an undersurface of the magnetic tape T with an appropriate urging force to thereby prevent the magnetic tape T from slackening.

The magnetic tape cassette 10 includes a pair of shafts 50 that are typically fixed to and project from an inner wall surface 14U of the lower half 14. Each of the shafts 50 penetrates a through hole 44H that is formed along the central axis of each guide roller 44. The guide rollers 44 are axially and rotatably supported around the shafts 50.

Figure 2:
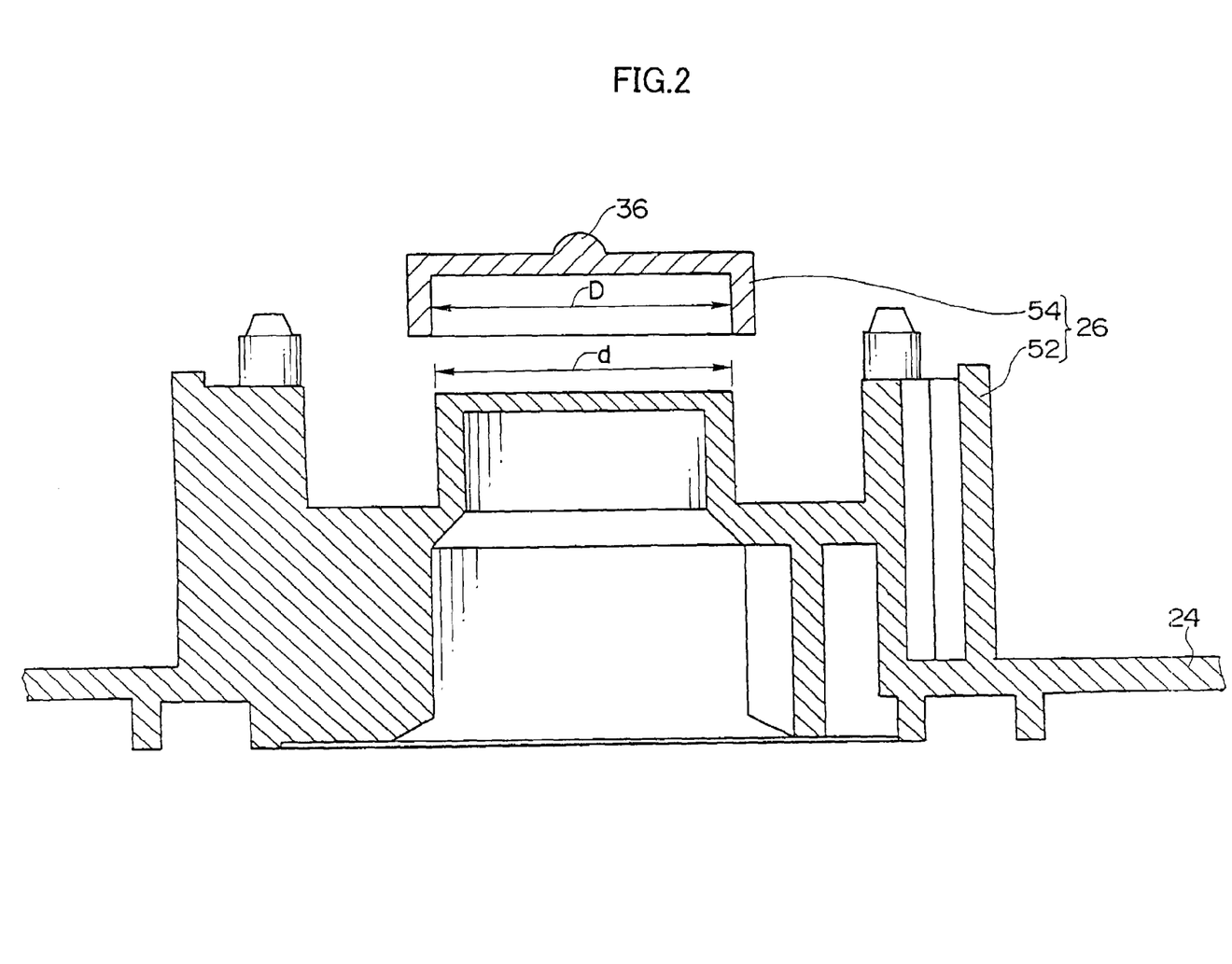
FIG. 2 is a side cross-sectional view showing a pivot member that has just been resin-molded being mounted on a hub body that has been resin-molded and cooled.
Figure 3:
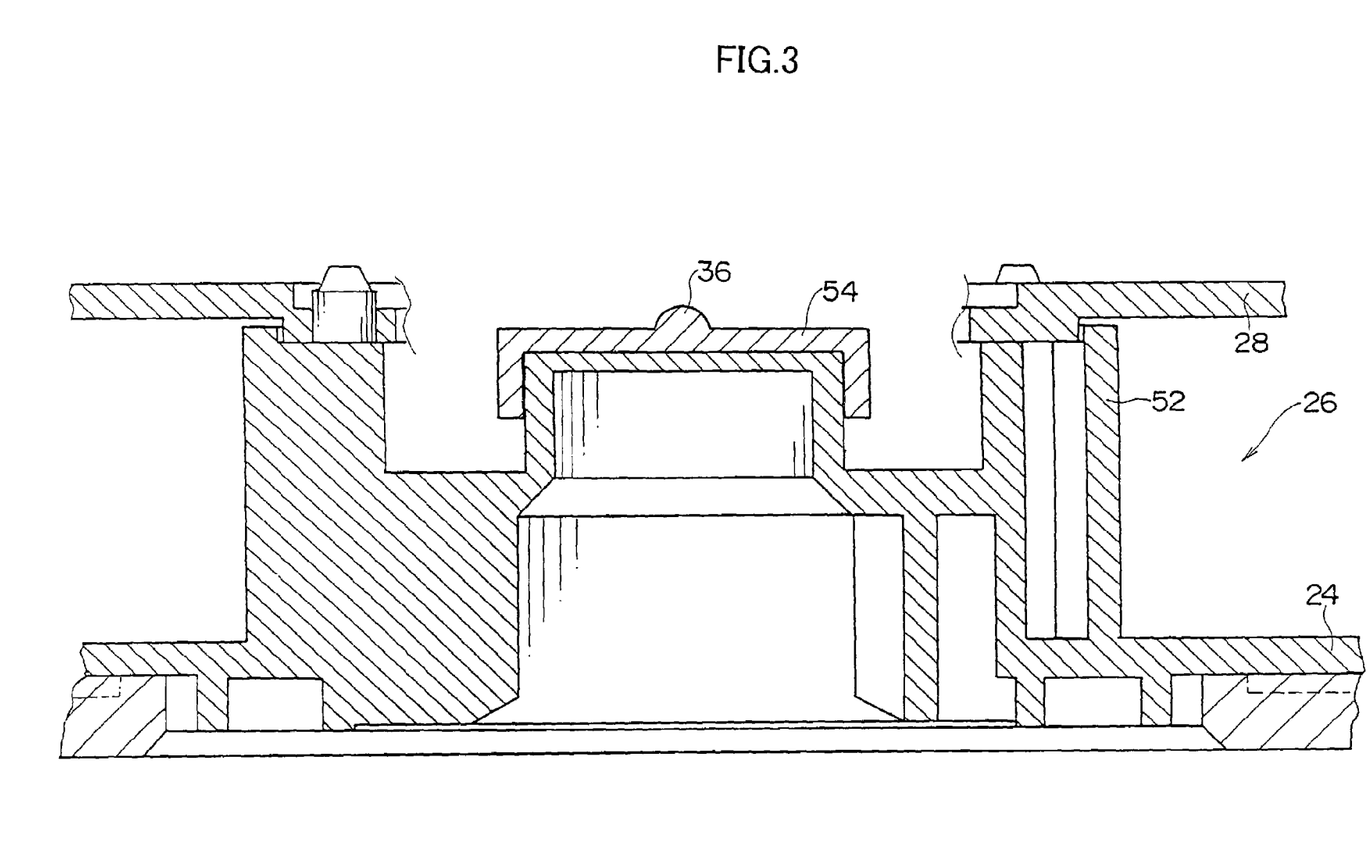
FIG. 3 is a side cross-sectional view showing the pivot member of the first embodiment fitted onto the hub body.

As shown in FIGS. 2 and 3, the hub 26 includes a hub body 52, and a hat-shaped pivot member 54 which is fitted onto and covers the hub body 52 from above.

A substantially semispherical pivot 36 is integrally molded with the central portion of a pivot member 54 at the upper side thereof. The pivot 36 is pressed by, for example, the reel holder 32A to thereby swingably retain the reel 20. The hub body 52 is formed by a general resin such as acrylnitrilbutadiene (ABS) or polystyrene (PS), and the pivot member 54 is made of a highly slick resin such as polyacetal (POM) resin.

The reels 20 are formed by molding the hub body 52 and the lower flange 24 integrally with each other, and then molding the pivot member after a predetermined amount of time. The amount of predetermined time is equivalent to a period in which the hub body 52 cools naturally and almost stops shrinking, and is ordinarily a day or so.

For example, considering that shrinkage of the hub body 52 is generally 5/1000 when the hub body 52 is formed by acrylnitrilbutadiene (ABS) resin, the pivot member 54 is molded such that an inner diameter D of the freshly molded pivot member 54 and an outer diameter d of a portion of the hub body 52 after cooling, which portion is fitted into the pivot member 54, substantially correspond to each other.

Namely, the dimension of the metal mold with which the hub body 52 is molded is predetermined considering that shrinkage of the outer diameter d of the fitting portion of the hub body 52 after cooling becomes 995/1000 as compared to the freshly molded pivot member 54.

The pivot member 54, which has just been molded, is capped over the hub body 52, and clamps the hub body 52 due to the shrinkage of the pivot member 54.

Therefore, neither pressing of the pivot member 54 into the hub member 52 nor molding of the fitting portion with high dimensional precision is needed. Accordingly, even if the pivot member 54 and the hub member 52 are molded into different members, the reels 20 can be manufactured with high productivity.

As long as the pivot member 54 can be fitted onto the hub body 52, the internal diameter D of the pivot member 54 which has just been molded, can be slightly larger than the outer diameter d of the fitting portion of the hub body 52 after cooling. Accordingly, further allowance of dimensions of fitting portions of the pivot member 54 and the hub body 52 becomes possible. Further, the lower flange 24 and the hub body 52 can be molded into different members, and the hub body 52 is fitted into the lower flange 24.

Second Embodiment

Description of a second embodiment of the present invention will now be given. In the present embodiment, portions identical to those shown in the first embodiment of the present invention are denoted by the same reference numerals and description thereof is omitted.

Figure 4:
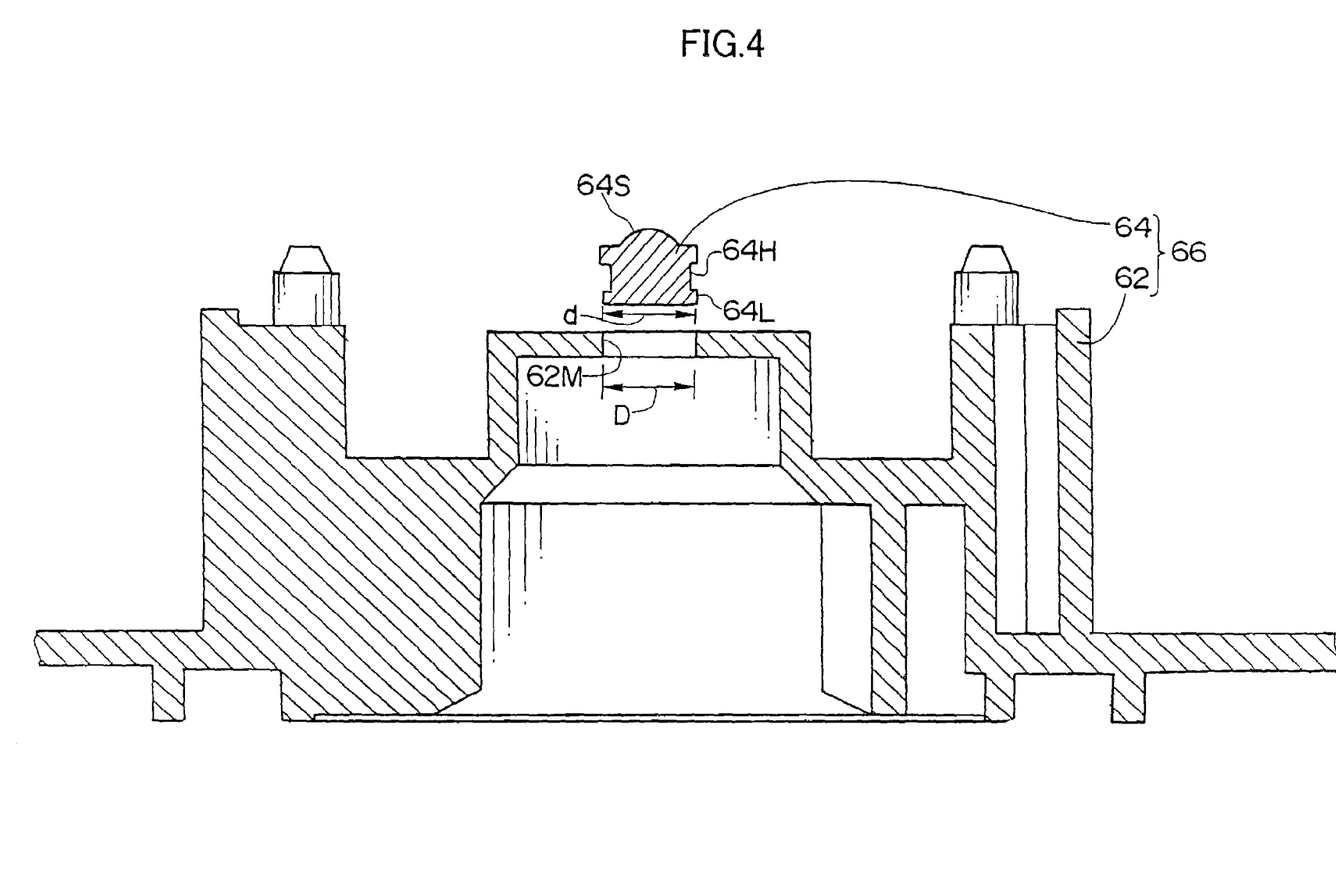
FIG. 4 is a side cross-sectional view showing a pivot member that has been resin-molded and cooled being inserted into an opening in a hub body that has just been resin-molded, according to a second embodiment of the present invention.

The second embodiment is similar to the first embodiment except that, as shown in FIG. 4, configurations of a pivot member 64 and a hub body 62 that structures a hub 66 are different from those in the first embodiment, and the pivot member 64 is molded before the hub body 62 is molded.

A substantially semispherical surface 64S is formed at the top of the pivot member 64 and contacts the inner bottom surfaces of, for example, the reel holders 32A (see FIG. 1). A recess 64H that engages with the hub body 62 is formed around the pivot member 64 at the central portion thereof.

An opening 62M into which the pivot member 64 is fitted is formed in the upper central portion of the hub body 62.

To manufacture the hub 66, the pivot member 64 is first molded, and then the hub body 62 is molded after a predetermined amount of time.

The hub body 62 is molded such that a diameter D of the opening 62M of the hub body 62, which has just been molded, and an outer diameter d of a lower end 64L of the pivot member 64 after cooling becomes almost the same.

Figure 5:
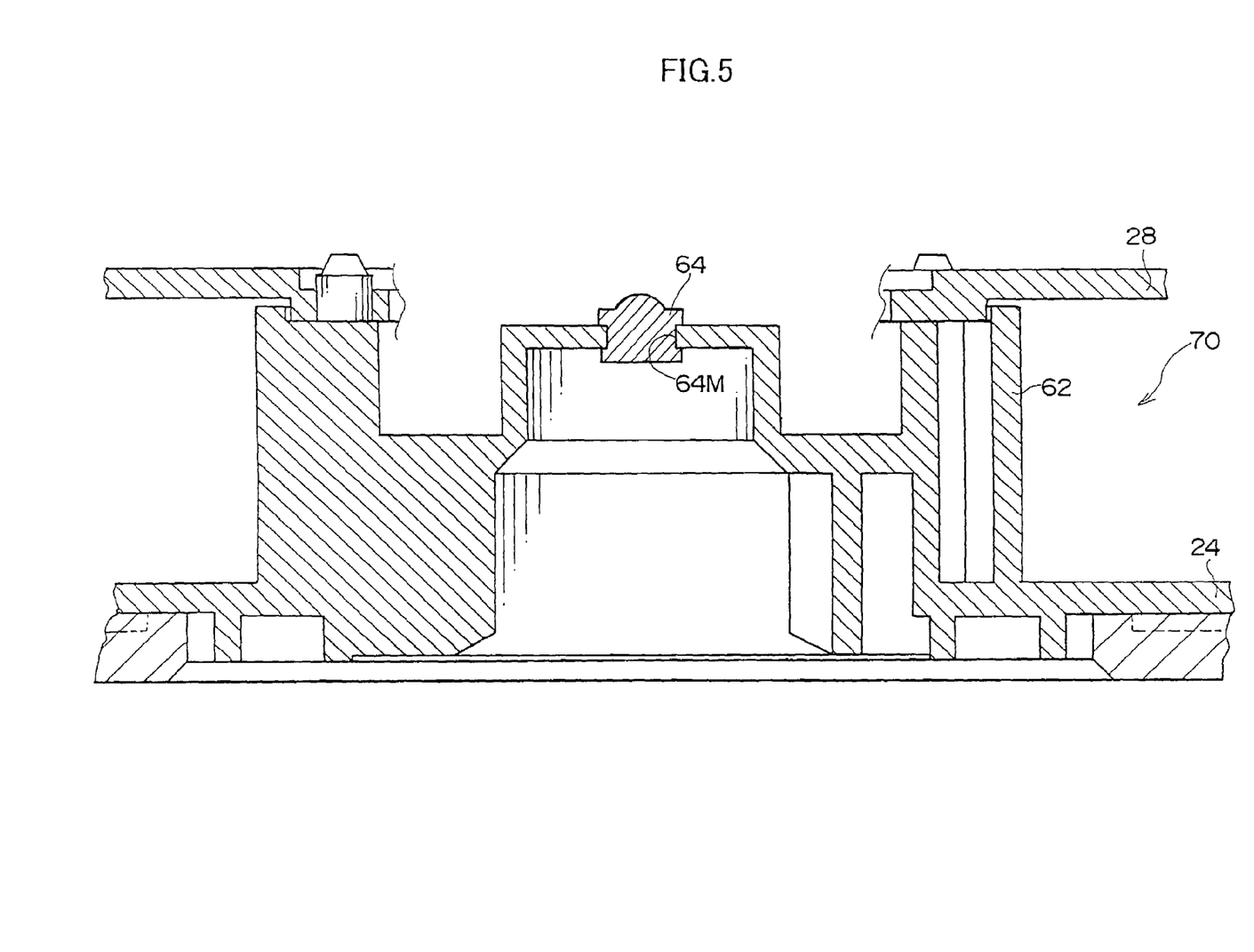
FIG. 5 is a side cross-sectional view showing the pivot member fitted into the hub body, according to the second embodiment of the present invention.

The pivot member 64, which has just been molded, is inserted into the opening 62M and fitted into the hub body 62 due to shrinkage of the hub body 62.

Accordingly, neither pressing of the pivot member 64 into the hub body 62 nor molding of the fitting portions of the pivot member 64 and the hub body 62 with high dimensional precision is needed. Consequently, even if the pivot member 64 and the hub body 64 are molded into different members, reels 70 can be manufactured with high productivity.

Similar to the first embodiment, as long as the pivot member 64 can be fitted into the hub body 62, the diameter D of the opening 62M, which has just been molded, can be slightly larger than the outer diameter d of the lower end 64L of the pivot member 64 after cooling.

Although the invention has been described with reference to specific embodiments, the invention is not limited to any of the details of description, unless otherwise specified, but must be constructed broadly within its spirit and scope as set out in the accompanying claims.

Since the invention is structured as described above, the mounting member can be mounted with high productivity. Further, the components which are just molded can be assembled without being temporarily stored for cooling.

What is claimed is:

1. A method of mounting a mounting member onto a member to be mounted, at least one of which is resin-molded, the mounting member and the member to be mounted are components of a magnetic tape cassette comprising the steps of:

molding separately the mounting member and the member to be mounted, wherein the mounting member is molded after the member to be mounted almost stops shrinking due to natural cooling, and the mounting member is molded such that a dimension of a portion at which the mounting member engages with the member to be mounted is substantially same as or larger than that of the member to be mounted after the shrinkage; and mounting the molded mounting member to the cooled molded member to be mounted, utilizing post-molding shrinkage of the mounting member.

2. The method of claim 1, wherein the mounting member and the member to be mounted are molded with different resins.

3. The method of claim 2, wherein the mounting member is formed from a highly slick resin.

4. A method of mounting a mounting member onto a member to be mounted, the mounting member and the member to be mounted being components of a magnetic tape cassette that are assembled together in the magnetic tape cassette, and at least one of which is resin-molded, the method comprising the steps of:

molding separately the mounting member and the member to be mounted, wherein the mounting member is molded after the member to be mounted almost stops shrinking due to natural cooling, and the mounting member is molded such that a dimension of a portion at which the mounting member engages with the member to be mounted is substantially same as or larger than that of the member to be mounted after the shrinkage; and assembling the mounting member and the cooled member to be mounted together, utilizing post-molding shrinkage of the mounting member.

5. The method of claim 1, wherein mounting the mounting member to the member to be mounted comprises capping the mounting member over the member to be mounted.

6. A method of mounting a mounting member onto a member to be mounted, at least one of which is resin-molded, the mounting member and the member to be mounted are components of a magnetic tape cassette comprising the steps of:

molding separately the mounting member and the member to be mounted, wherein the mounting member is molded after the member to be mounted almost stops shrinking due to natural cooling, and the mounting member is molded such that a dimension of a portion at which the mounting member engages with the member to be mounted is substantially same as or larger than that of the member to be mounted after the shrinkage; and mounting the molded mounting member to the cooled molded member to be mounted, utilizing post-molding shrinkage of the mounting member, wherein mounting the molded mounting member to the molded member to be mounted comprises capping the molded mounting member over the molded member to be mounted, and wherein the member to be mounted is molded separate from the mounting member.

7. A method of mounting a mounting member onto a member to be mounted, the mounting member and the member to be mounted being components of a magnetic tape cassette that are assembled together in the magnetic tape cassette, and at least one of which is resin-molded, the method comprising the steps of:

molding separately the mounting member and the member to be mounted, wherein the mounting member is molded after the member to be mounted almost stops shrinking due to natural cooling, and the mounting member is molded such that a dimension of a portion at which the mounting member engages with the member to be mounted is substantially same as or larger than that of the member to be mounted after the shrinkage; and assembling the mounting member and the cooled member to be mounted together, utilizing post-molding shrinkage of the mounting member, wherein mounting the mounting member to the member to be mounted comprises capping the mounting member over the member to be mounted, and wherein the member to be mounted is molded separate from the mounting member.

8. The method of claim 1, wherein the mounting member includes a pivot portion and is formed of POM resin.

9. The method of claim 4, wherein the mounting member includes a pivot portion and is formed of POM resin.

10. The method of claim 1, wherein the mounting member is fitted on top of the member to be mounted.

11. The method of claim 1, wherein mounting member comprises a lid portion which caps the member to be mounted.

* * * * *